(12) United States Patent
Cobb et al.

(10) Patent No.: US 9,036,891 B2
(45) Date of Patent: May 19, 2015

(54) INTRINSIC PHYSICAL LAYER AUTHENTICATION OF INTEGRATED CIRCUITS

(71) Applicant: The United States of America, as represented by the Secretary of the Air Force, Washington, DC (US)

(72) Inventors: William E Cobb, Beavercreek, OH (US); Michael A. Temple, Huber Heights, OH (US); Rusty O. Baldwin, Huber Heights, OH (US); Eric W Garcia, Dayton, OH (US); Eric D. Laspe, San Jose, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 249 days.

(21) Appl. No.: 13/663,051

(22) Filed: Oct. 29, 2012

(65) Prior Publication Data

US 2013/0108145 A1    May 2, 2013

Related U.S. Application Data

(60) Provisional application No. 61/553,218, filed on Oct. 30, 2011.

(51) Int. Cl.
*G06T 1/00* (2006.01)
*G06K 19/07* (2006.01)

(52) U.S. Cl.
CPC .......... *G06T 1/0021* (2013.01); *G06K 19/0718* (2013.01)

(58) Field of Classification Search
CPC .................. G06T 7/0004; G06T 7/001; G06T 2201/0051; H04N 2201/327
USPC ........................... 382/141, 100; 713/193, 176
See application file for complete search history.

(56) References Cited

U.S. PATENT DOCUMENTS

| 7,840,803 | B2 | 11/2010 | Clarke et al. |
| 2003/0204743 | A1 | 10/2003 | Devadas et al. |
| 2006/0271793 | A1 | 11/2006 | Devadas et al. |
| 2008/0279373 | A1 | 11/2008 | Erhart et al. |
| 2010/0127822 | A1 | 5/2010 | Devadas |
| 2010/0177898 | A1 | 7/2010 | Tuyls et al. |

OTHER PUBLICATIONS

Cobb et al: "Intrinsic physical-layer authentication of integrated circuits", IEEE-IFS, published on Jun. 20, 2011.*

(Continued)

*Primary Examiner* — Ruiping Li
(74) *Attorney, Agent, or Firm* — AFMCLO/JAZ; Charles Figer, Jr.

(57) ABSTRACT

A system and method of generating and comparing a fingerprint for an integrated circuit is provided. A sensor module captures electromagnetic emissions from the integrated circuit. A feature extraction module extracts discriminating features from the captured electromagnetic emissions. A classifier training module generates a plurality of authentication fingerprints of the integrated circuit from the extracted discriminating features creating a reference fingerprint template for the integrated circuit. The reference template for the integrated circuit is stored in a database. For authentication, the reference fingerprint template from the database is compared to the generated authentication fingerprint.

19 Claims, 7 Drawing Sheets

(56) References Cited

OTHER PUBLICATIONS

Cobb et al, "Physical layer identification of embedded devices using RF-DNA fingerprinting", the 2010 military communications conf. opened on Oct. 31, 2010.*

Danev et al., "Physical-layer Identification of RFID Devices", SSYM'09 Proceedings of the 18th Conference on USENIX Security Symposium, pp. 199-214, 2009.

DeJean et al., "RF-DNA: Radio-Frequency Certificates of Authenticity," Proceedings CHES 2007, 9th International Workshop, pp. 346-363, Sep. 2007.

Ravikanth, "Physical One-Way Functions," Doctoral Thesis, Massachusetts Institute of Technology, Mar. 2001.

Reising et al., "Improved wireless security for GMSK-based devices using RF fingerprinting," International Journal of Electronic Security and Digital Forensics, vol. 3, No. 1, pp. 41-59, Mar. 2010.

* cited by examiner

INTRINSIC PHYSICAL LAYER AUTHENTICATION OF INTEGRATED CIRCUITS

CROSS-REFERENCE TO RELATED APPLICATIONS

This application claims the benefit of and priority to U.S. Provisional Application Ser. No. 61/553,218, entitled "Intrinsic Physical Layer Authentication of Integrated Circuits," filed on Oct. 30, 2011, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

This invention relates generally to authentication of devices, and in particular, to authentication of integrated circuits.

2. Description of the Related Art

Establishing trust through authentication of individuals or devices is an important, but exceptionally difficult problem. There are a wide variety of scenarios where it is desirable to ensure that a system and its components are authentic and have not been tampered with in any way. The establishment of trust is a prerequisite for cryptographic and other secure systems, but is also important to ensure subsystems and their components are trustworthy and have not been tampered with in other critical applications—particularly those involving human safety. Secure tokens and other essential system components may be counterfeited, duplicated, or have PIN numbers, passwords, or other cryptographic key material extracted. Mobile environments exacerbate the problem since requirements for small size, low cost and low power consumption severely restrict the types of security mechanisms that mobile tokens can incorporate. Such tokens are frequently based on inexpensive, high-volume commercial micro-controllers in a smart-card or secure "key fob" form factor where implementation security may have been a relatively low design priority.

These small mobile devices with embedded integrated circuits (ICs) have gained widespread adoption in a variety of industries and are used in such diverse applications as: financial account access (credit cards, ATM cards, etc.), electronic funds storage/electronic wallets (public transportation payment cards), personal identification (government IDs, drivers licenses, passports), electronic identification (encrypted email, computer system or network access, cellular network access), building or secure area access control (building entry cards, multi-purpose IDs), etc.

For each of these applications, the device containing an IC is part of an overall authentication scheme. Generally, authentication schemes may be either single- or multi-factor, where some possible factors may include: "something the user knows," "something the user has," or "something the user is." For example, security or identity tokens aim to improve the security of authentication by incorporating "something the user has," with on-chip storage or through integration using other secure protocols in multi-factor schemes such as "something the user knows" (PIN number or password), or "something the user is" (biometric identification).

Although multi-factor authentication schemes provide additional security when properly employed, the way IC-based authentication tokens are typically used ("something the user has") makes them a tempting target for fraudulent or other nefarious activity. Various techniques are known to exist that enable the cloning of the contents of an IC-based token or smart-card. For security applications or access controls, this presents a substantial problem since the cloned token can be used to gain fraudulent access to a system or resource such as payment accounts, computer systems, physical locations, etc.

Physical implementation attacks on secure electronics systems have evolved rapidly making it increasingly difficult for new countermeasures and security practices to keep pace. In contrast to mathematical cryptanalytic attacks which are typically hypothetical in nature, implementation attacks present a serious and immediate threat since the strength of the underlying algorithm and protocols is rendered largely irrelevant. Examples of implementation attacks range from complex techniques requiring expensive and highly specialized equipment (e.g. laser fault injection or focused ion beam manipulation) to surprisingly simple, low-cost attacks targeting the unintentional information leakage produce by devices during normal operation (e.g., simple power analysis).

Given that many implementation attacks are well within the reach of even modestly funded and minimally equipped individuals, they should be given serious practical consideration when designing modern systems. A prudent design approach is to 1) assume that secure tokens or other essential system components are subject to counterfeiting, cloning, or sensitive data extraction, and 2) take appropriate steps to mitigate the associated risks as part of an integrated, multi-tiered system security architecture.

What is needed, therefore, is a method for verifying the authenticity of secure devices to detect or block the use of counterfeit or cloned tokens.

SUMMARY OF THE INVENTION

Embodiments of the invention provide a system and a method of generating a fingerprint for an integrated circuit. A sensor module is configured to capture electromagnetic emissions from the integrated circuit. A feature extraction module is configured to extract discriminating features from the captured electromagnetic emissions. A classifier training module is configured to generate a plurality of authentication fingerprints of the integrated circuit from the extracted discriminating features in order to create a reference fingerprint template for the integrated circuit. The reference fingerprint template for the integrated circuit is stored in a database for later authentication.

Embodiments of the invention additionally provide a system and method of characterizing an integrated circuit. The sensor module captures electromagnetic emissions from the integrated circuit. The feature extraction module extracts discriminating features from the captured electromagnetic emissions. The classifier training module generates an authentication fingerprint of the integrated circuit from the extracted discriminating features. Then a reference fingerprint template for the integrated circuit is retrieved from the database. The reference fingerprint template from the database is compared to the generated authentication fingerprint for validation.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 5A is a flowchart of fingerprint validation used in the flowchart in FIG. 5.

Figure 1:
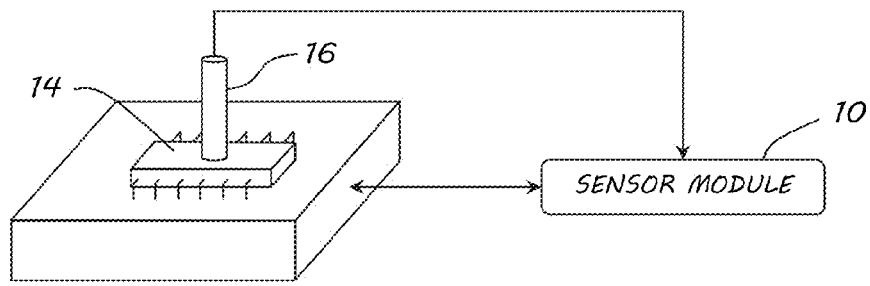
FIG. 1 is a schematic diagram of a sensor module interface to an integrated circuit.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Contemporary integrated circuit (IC) fabrication processes are necessarily very precise; however, structural variations may still be introduced in each individual IC device on a very small scale (deep sub-micron in contemporary IC technology). These variations are inherent in the random nature of the fabrication processes, and are known to exist even for chips fabricated using the same lithography mask or cut from the same wafer. As a result, no two chips are exactly alike. As long as process-induced variations are within acceptable tolerances, the device operates correctly from a black-box functional perspective. But, those same variations also result in each chip possessing unique electrical properties that are manifested in various physically observable forms.

The existence of process-induced inter-device variation is well documented, and various methods have been proposed to take advantage of their uniqueness as a mechanism to enhance security. For example, physical layer device security approaches may include the use of physically unclonable functions (PUFs) and an exploitation of unique signal coloration produced by intentional emitters such as wireless networking equipment.

Contemporary PUF techniques may generally be separated into two basic approaches for device authentication. The first augments an IC with specialized internal measurement circuitry that computes a one-way function from glitch counts, propagation delays, or other electrical properties that vary randomly with the intrinsic process variations of the IC. A second approach applies an external coating composed of a material that is random in nature, and which may be actively "interrogated" in order to measure the unique properties of the random distribution of particles. Both of these techniques require either internal or external modification of the IC being authenticated.

But, all electronic circuits produce unintentional electromagnetic (EM) emissions as a byproduct of their operation. These emissions can span the full EM spectrum. In the interest of simplicity and clarity, the following discussion will illustrate embodiments of the invention utilizing a radio frequency (RF) portion of the EM spectrum, though it is contemplated that embodiments of the invention may utilize any portion of the EM spectrum as well as variations in conducted emissions or power consumption. A significant source of unintentional RF emissions in contemporary micro-processors is switching activity of transistors used to control propagation paths of data through the circuit. Many contemporary integrated circuits, including general- and special-purpose embedded micro-controllers, are based on complementary metal oxide semiconductor (CMOS) transistor technology. As operations are executed and data is processed, the individual CMOS transistors switch "on" and "off", dynamically producing variations in current flow due to the charging and discharging of intrinsic capacitances, momentary short-circuits created during transition between states, and glitching activity of the logic cells encountered before the circuit settles into its intended steady-state output. The variations in current activity produce (EM) fields that combine through complex interactions and propagate via both radiation and conduction (to the power supply and ground lines as well as other conductive materials) in the form of time-varying EM waves. The fundamental nature of these effects is well understood as described by Maxwell's equations.

The unique characteristics of these effects may be utilized as "fingerprints" and may be adopted in embodiments of the invention as a way to augment existing multi-factor authentication schemes via physical layer authentication at the device level to counter cloning and related threats. The term RF "distinct native attributes" (RD-DNA), is used to embody the coloration of RF emissions induced by the intrinsic physical attributes of a unique device. The EM emanations induced by circuit operation may be grouped into two primary categories—direct and indirect. Direct emanations are generally created by the switching activity in the transistors or other solid state devices and the resulting current flow through a circuit's intended current path. Indirect emanations are generally created when small couplings between densely packed electronic components modulate existing carrier signals (both intentional and unintentional) emitted from the device, e.g. those due to harmonics of the system clock frequency. Embodiments set forth below focus on the direct emanations, though other embodiments may additionally or alternately utilize indirect emanations.

With a RF-DNA approach implemented in embodiments of the invention, semiconductor-based IC devices may be passively recognized based on discriminating features, referred to as "RF-DNA fingerprints," extracted from their intrinsic physical properties in a manner analogous to biometric human identification. Because these embodiments exploit emissions caused by intrinsic inter-device variability, they may be suitable for a variety of security applications involving commodity commercial ICs, and do not require any physical device modifications. Moreover, embodiments of the invention employing this technique may be adapted to work with existing processes and protocols, and are likely suitable for use with a wide variety of IC devices, e.g., general purpose microcontrollers, programmable logic devices such as FPGAs, and custom ASICs.

Figure 2:
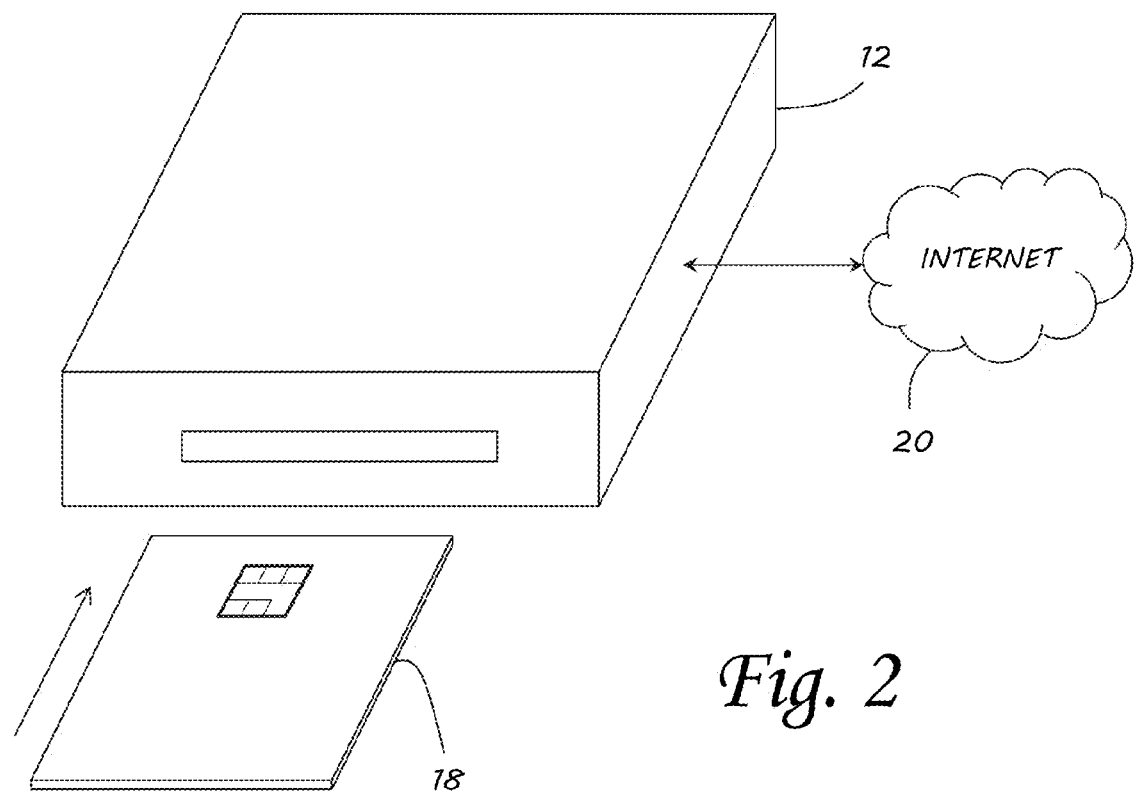
FIG. 2 is a diagram of a smart card reader with an integrated sensor module.

Exemplary IC authentication systems may be composed of several components, including a sensor module 10, 12, a feature extraction module, a classifier training module, a system database module, and a classification and feature-matching module. The sensor module 10, 12, such as illustrated in FIGS. 1 and 2, may include a circuit 14 to measure the conductive power consumption produced by the circuit, an EM sensor (antenna or probe) 16 and receiver, or both. The sensor module 10, 12 may be a separate auxiliary device (such as 12) connected to a standard interrogation terminal (e.g., smart-card 18 reader, ATM console, credit-card reader, etc.) or integrated directly into an existing infrastructure and optionally connected to the Internet 20.

The feature extraction module may include functionality to generate features from the measured signal (radiated or conductive emissions) based on the statistical behavior of one or more instantaneous responses within pre-defined signal regions as set forth in further detail below. Both device enrollment and feature matching processes may use the feature extraction module to generate a statistical fingerprint for each captured signal. The classifier training module post-processes the enrollment fingerprint data to reduce the dimensionality of the resulting data and produce a final reference template for each enrolled device.

The system database module may be used to store the set of enrollment fingerprint data and the reference fingerprint template associated with each enrolled device. As each device is issued or associated with a particular digital identity, the database may be updated to reflect the pairing, e.g., device A1 belongs to John Smith.

The classification/feature matching module compares a newly acquired authentication fingerprint to the stored reference template(s) in the system database to identify the device or verify its presented identity. For authentication applications, this module may be responsible for determining whether or not a presented device is authentic or an imposter.

Figure 3:
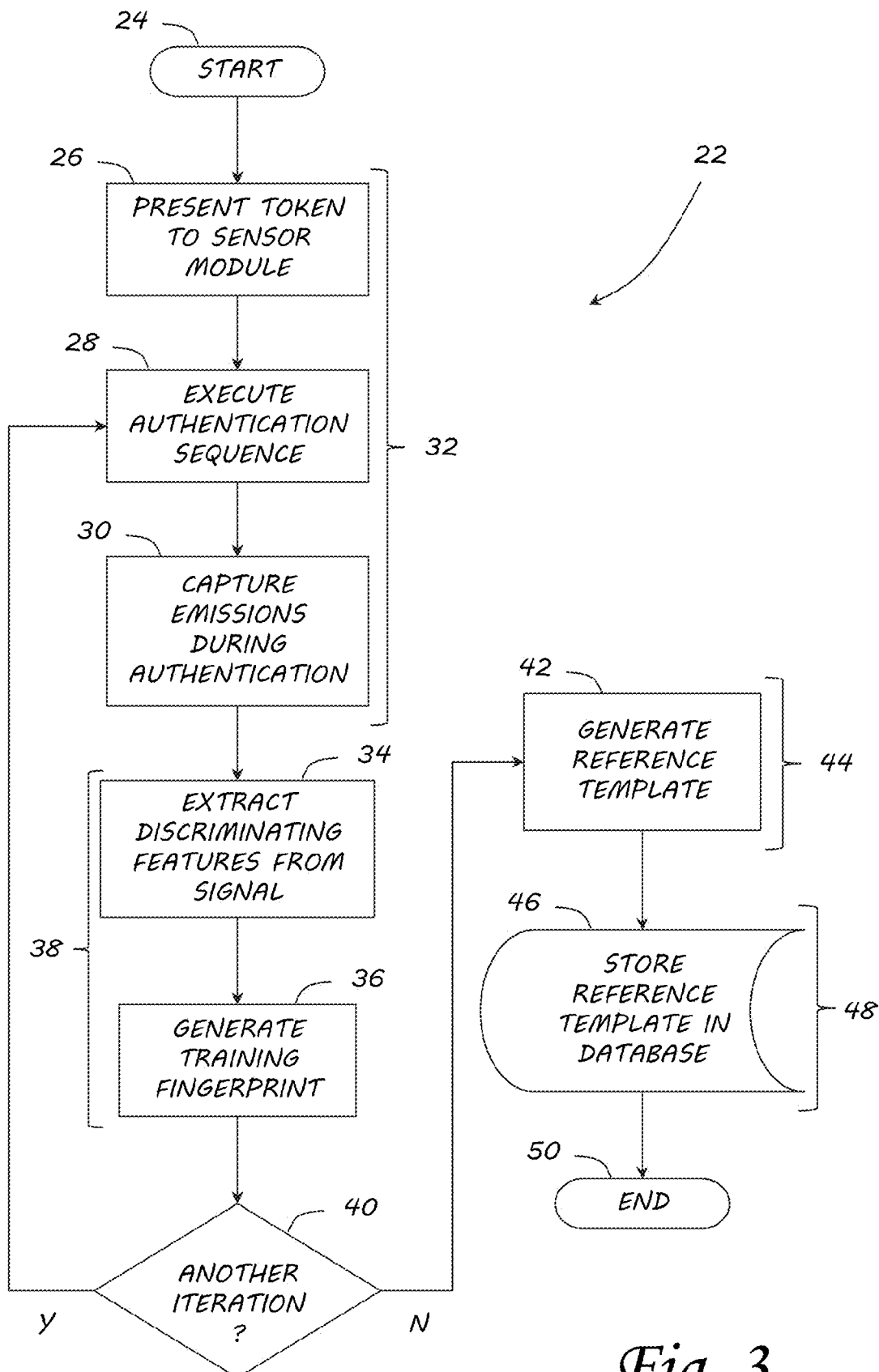
FIG. 3 is a flowchart of a device enrollment procedure consistent with embodiments of the invention.

FIG. 3 contains a flowchart 22, which illustrates the basic steps involved in fingerprinting each device at enrollment. Each of the functional modules that are responsible for each of the steps, including the sensor module, feature extraction module, classifier training module, and the system database module are related to functional blocks in the flowchart 22 and will be identified below. The process in flowchart 22 starts at block 24. The circuit 14 presented to the sensor module in block 26. The circuit 14 is then commanded to execute a short pre-defined sequence of operations (the "challenge") in block 28. The radiated and/or conductive emissions produced by the device are captured as it executes the operation sequence (the "response") in block 30. These three process blocks 26-30 may be performed by a sensor module 32 in some embodiments. After emission capture by the sensor module 32, discriminating features may be extracted from the captured emissions in block 34. These extracted features may then be used to produce a device "fingerprint" in block 36. In some embodiments, these two process blocks 34, 36 may be performed by a feature extraction module 38.

In some embodiments, in order to determine a statistical nature of the generated fingerprints, multiple fingerprints need to be generated. This may be accomplished by repeating the steps in the sensor module 32 and feature extraction module 38. A number of fingerprints may be determined for the circuit based on any number of factors including speed, storage, etc. For example, in one exemplary embodiment, the number of iterations may be approximately 500, though more or fewer iterations are contemplated. If $N_{FP}$ (number of fingerprints) is less than that total fingerprints to be collected ("Yes" branch of decision block 40), then the process repeats at block 28 to obtain a full set of enrollment training fingerprint data. If $N_{FP}$ equals the or exceeds the total fingerprints to be collected ("No" branch of decision block 40, the set of extracted training fingerprints is processed to generate a "reference template" in block 42 for each enrolled device, such as circuit 14. In some embodiments, if there are multiple challenge-response sequences, the process may be repeated for each of the additional challenge-response sequences. Each set of training fingerprints and generated reference template may be stored in a database in block 46. The process ends at block 50.

Figure 4:
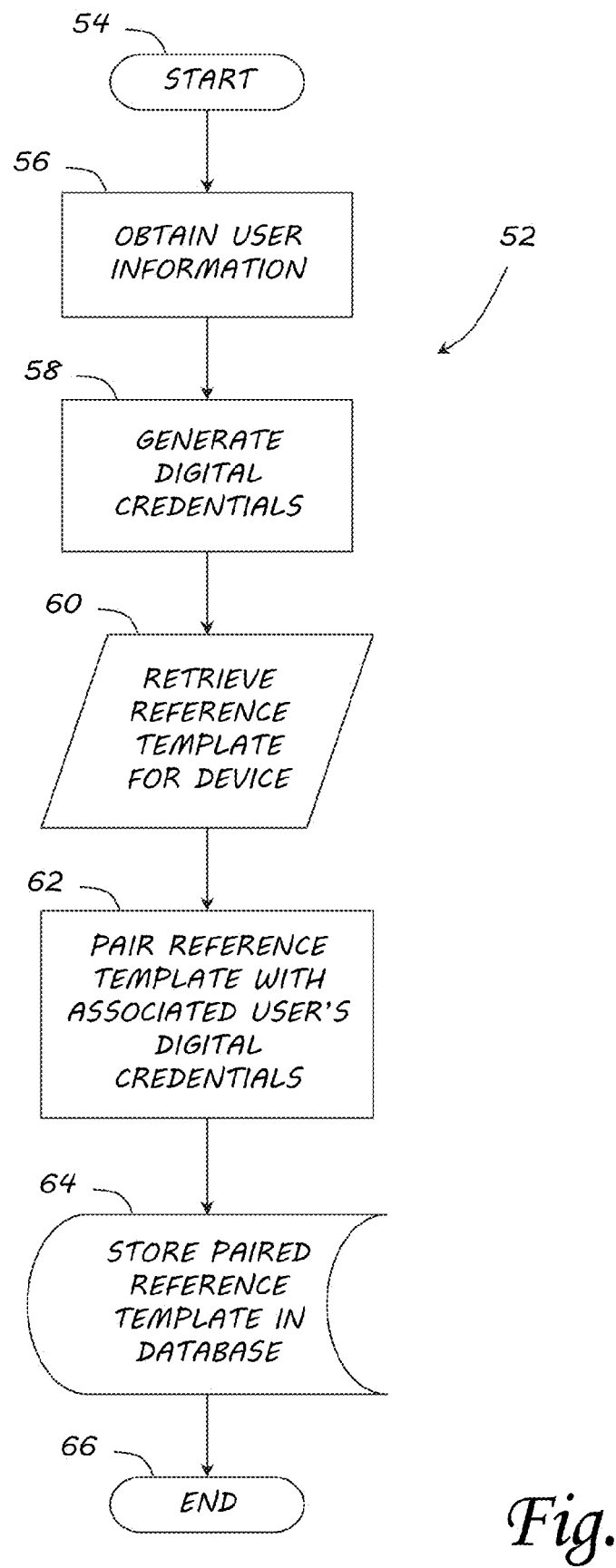
FIG. 4 is a flowchart of a fingerprint/credential pairing procedure consistent with embodiments of the invention.

When the physical device is distributed to an individual or paired with a set of digital credentials, see flowchart 52 in FIG. 4, the database may be updated to associate the stored reference template with those digital credentials. The process begins at block 54. Information about the individual is obtained in block 56. Digital credentials are generated from the obtained information in block 58. The reference fingerprint template for the device, such as circuit 14, is retrieved from the database in block 60. The fingerprint template is paired with the associated individual's digital credentials in block 62. The paired reference template is then again stored in the database in block 64. The process ends in block 66.

In the context of a cryptographic challenge-response system, each commanded operation sequence may be considered a challenge. The observed emissions (conductive or radiated) produced by the device while executing the commands is the response. When possible, device configuration (clock rate, on-chip peripheral status, etc.) should be controlled to a known state during the challenge-response operation sequence. Reconfigurable devices such as field programmable gate arrays (FPGAs) may be reset to a pre-defined authentication configuration.

Figure 5:
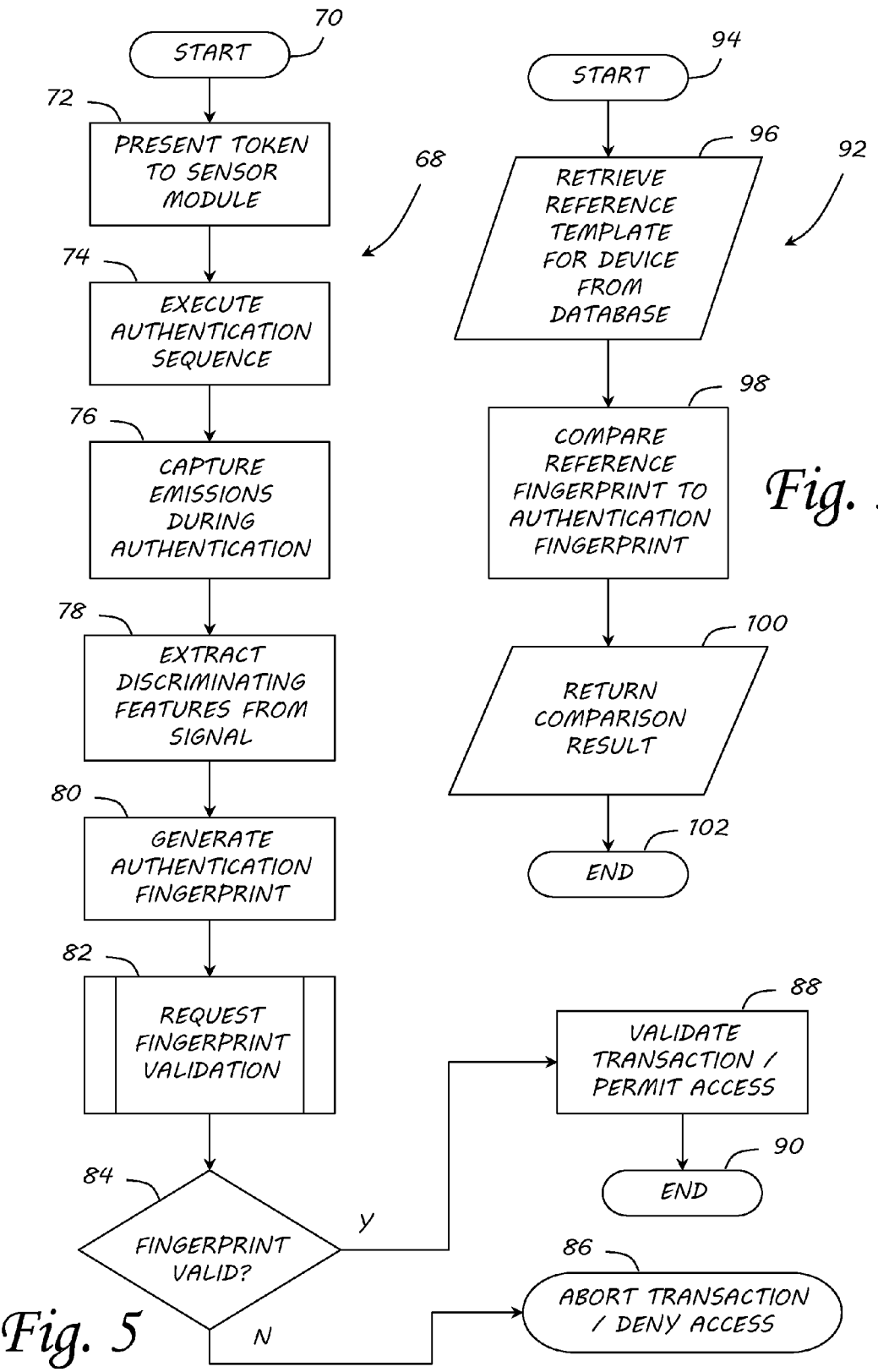
FIG. 5 is a flowchart of a device authentication procedure consistent with embodiments of the invention.

After enrollment, subsequent device authentication tasks may be performed by repeating the challenge-response protocol to obtain an authentication fingerprint. The authentication fingerprint may be processed by the classification/feature-matching module for identification or verification as depicted by flowchart 68 in FIG. 5. The process begins at block 70. The device is presented to the sensor module in block 72. The device is instructed to execute the authentication sequence in block 74. Emissions from the device during the execution of the authentication sequence are captured in block 76. Discriminating features are extracted from the captured emissions in block 78. An authentication fingerprint is generated in block 80 from the extracted features. A request for validation of the fingerprint is performed in block 82. If the fingerprint is not valid ("No" branch of decision block 84), then the transaction is aborted or access may be denied in block 86 and the process ends. Otherwise, if the fingerprint is valid ("Yes" branch of decision block 84), then the transaction may be validated or access may be permitted in block 88. The process ends after validation in block 90. In some embodiments, the validation of the fingerprint may be accomplished based on a method illustrated in flowchart 92 in FIG. 5A, though other validation methods may also be used. The process begins in block 94. A reference fingerprint template for the device may be retrieved from a database in block 96. The received authentication fingerprint is compared to the template retrieved from the database in block 98. In some embodiments this comparison may also include information related to the individual who was issued the device being verified. The comparison result is returned in block 100 and the process completes at block 102.

Further details of the methodology utilized by embodiments of the invention will be illustrated using a specific embodiment. For this embodiment, unintentional RF emissions of four 16-bit PIC micro-controllers (PIC24FJ64GA002) manufactured by Microchip Technology, Inc. are evaluated. The PIC devices are representative of the low cost microcontrollers used in a variety of real-world commercial security applications such as garage door openers and remote keyless entry systems and are easy to obtain through normal commercial channels. All four chips used were from the same manufacturing batch—thus, all layout and architectural features should be identical. The only physical differences between chips are those resulting from variations in the fabrication processes.

Figure 6:
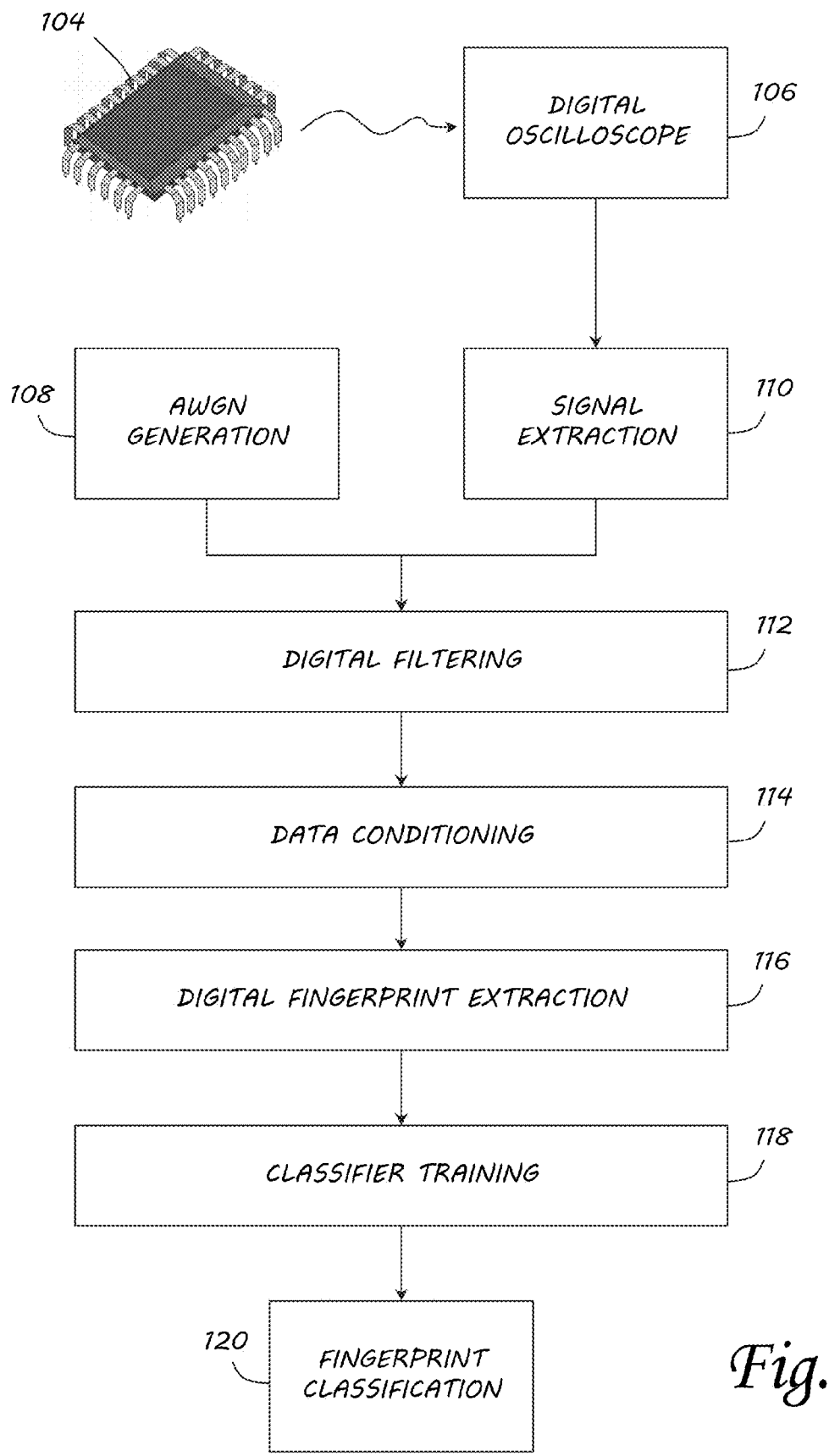
FIG. 6 is a diagram illustration the components for signal collection and pre-classification processing.

Unintentional RF emissions from each micro-controller 104 are collected using a near-field probe (1 GHz bandwidth) connected to a Lecroy 104-Xi-A oscilloscope 106 as shown in FIG. 6. The probe acts as an antenna to receive the unintentional emissions from the device under test, and does not directly contact the chip 104. In this embodiment, data was collected at a sample rate of 1 GSa/sec, though other embodiments may use other sample rates.

A near-field probe is mounted on a computer-controlled motorized XYZ table for consistent placement of the probe relative to the device under test. The initial probe position was established by performing a two-dimensional scan of the surface of the first tested chip as it repeatedly executed a sequence of operations. The results of the scan were processed with a band pass filter and analyzed to determine the location of maximal RF energy in the band corresponding to the known internal clock frequency (Fosc) of approximately 29.48 MHz. The probe and relative device positions remained fixed for all collections. To improve collection efficiency and reduce required post-processing for signal alignment, the PIC micro-controllers 104 are controlled by a PC over an RS-232 serial interface, though in other embodiments, the micro-controllers may be stand alone or be controlled by other devices. Each micro-controller repeatedly performs an identical sequence of operations on known (constant) data. At the start of the operation sequence, the micro-controller 104 asserts a trigger signal on one of its general purpose input/output (GPIO) pins. The oscilloscope 106 is configured to collect the RF signal for a fixed time interval each time the trigger is asserted. This enables precise identification and alignment of the individually collected signals without the need for extensive post-processing. Although a trigger signal is used for experimental efficiency, the signals observed have several obvious amplitude-response features that would allow similar results through automated post-processing and alignment without the aid of a trigger in other embodiments.

Experiments showed that the unintentional RF emissions exhibit some temperature-dependency as the device(s) warm up to their normal operating temperature. To compensate for these effects, each device is operated for approximately 10 minutes to allow temperature stabilization before collecting the data used for fingerprinting. After the initial warm-up period, $N_S$=500 signals are collected from each chip as it repeatedly performs the same sequence of operations. It is contemplated that temperature-effects could also be accounted for by accomplishing the training procedure over the range of expected environmental conditions.

In some embodiments, the signal collection is accomplished in a somewhat ideal laboratory environment—limiting outside influences and noise where possible. To assess the performance of the technique under less ideal conditions in other embodiments (noisier integrated systems, poor probe positioning, increased separation between sensor and system under test, etc.), the captured signals are power-scaled for analysis. To evaluate performance at lower SNR conditions the collected signals are combined with like-filtered additive white Gaussian noise (AWGN) generated in block 108 to achieve desired analysis SNRs of about $-10 \leq SNR \leq$ about 27 dB in approximately 1 dB increments as seen in FIG. 6. During pre-classification processing, the baseband signal extracted in block 110 and AWGN are digitally filtered in block 112 using the same filter, i.e., a lowpass Butterworth filter with approximately a $-3$ dB bandwidth of WBB equaling about 80 MHz, though other embodiments may use other filters. Additional data conditioning may then be performed in block 114.

A variety of techniques can be used for feature extraction in block 116. An approach in one embodiment is to directly use the instantaneous amplitude response; however, computational requirements for this approach increase rapidly.

Some embodiments may utilize instantaneous feature extraction. Using a SNR scaled analysis signal, three instantaneous responses are processed for each collection—instantaneous amplitude (IA) given by a(n), instantaneous phase (IP) given by $\phi$(n), and instantaneous frequency (IF) given by f(n). To calculate $\phi$(n) and f(n), the real valued signal is converted to complex I and Q data, $s_{C(t)} = s_{I(t)} + s_{Q(t)}$, using a Hilbert transform. The IP is then:

$$\phi(n) = \tan^{-1}\left[\frac{s_{Q(n)}}{s_{I(n)}}\right], \quad (1)$$

and the IF (in Hz) is:

$$f(n) = \frac{1}{2\pi}\left[\frac{d\phi(n)}{dt}\right]. \quad (2)$$

The IA and IF are then "centered" using the amplitude and frequency means ($\mu_a$ and $\mu_f$) to remove collection biases:

$$a_c(n) = a(n) - \mu_a, \quad (3)$$

$$f_c(n) = f(n) - \mu_f. \quad (4)$$

Finally, the responses in (3) and (4) are normalized by their respective maximum magnitudes to account for any uncontrolled power variation.

Other embodiments may utilize statistical fingerprint generation. After centering and normalization, four statistical features may be generated for each instantaneous response: standard deviation ($\sigma$), variance ($\sigma^2$), skewness ($\gamma$) and kurtosis ($\kappa$). For an arbitrary centered and normalized sequence $\{\bar{x}_c(n)\}$ having $N_x$ samples, the statistics are:

$$\sigma^2 = \frac{1}{N_x}\sum_{n=1}^{N_x}(\bar{x}_c(n) - \mu)^2, \quad (5)$$

$$\gamma = \frac{1}{N_x\sigma^3}\sum_{n=1}^{N_x}(\bar{x}_c(n) - \mu)^3, \text{ and} \quad (6)$$

-continued $$\kappa = \frac{1}{N_x \sigma^4} \sum_{n=1}^{N_x} (\bar{x}_c(n) - \mu)^4. \quad (7)$$

Each statistic is calculated over $N_R$ equal length, contiguous sub-regions spanning a selected sequence of samples $\{x(n)\}$. The region considered is empirically selected from the collected signal as the samples corresponding to the first $N_{CL}$ clock cycles worth of operations from the overall captured sequence. Experimentation with some embodiments confirmed that partitioning the samples into sub-regions corresponding to whole multiples of the number of clock cycles in the region of interest yields good results.

Figure 7:
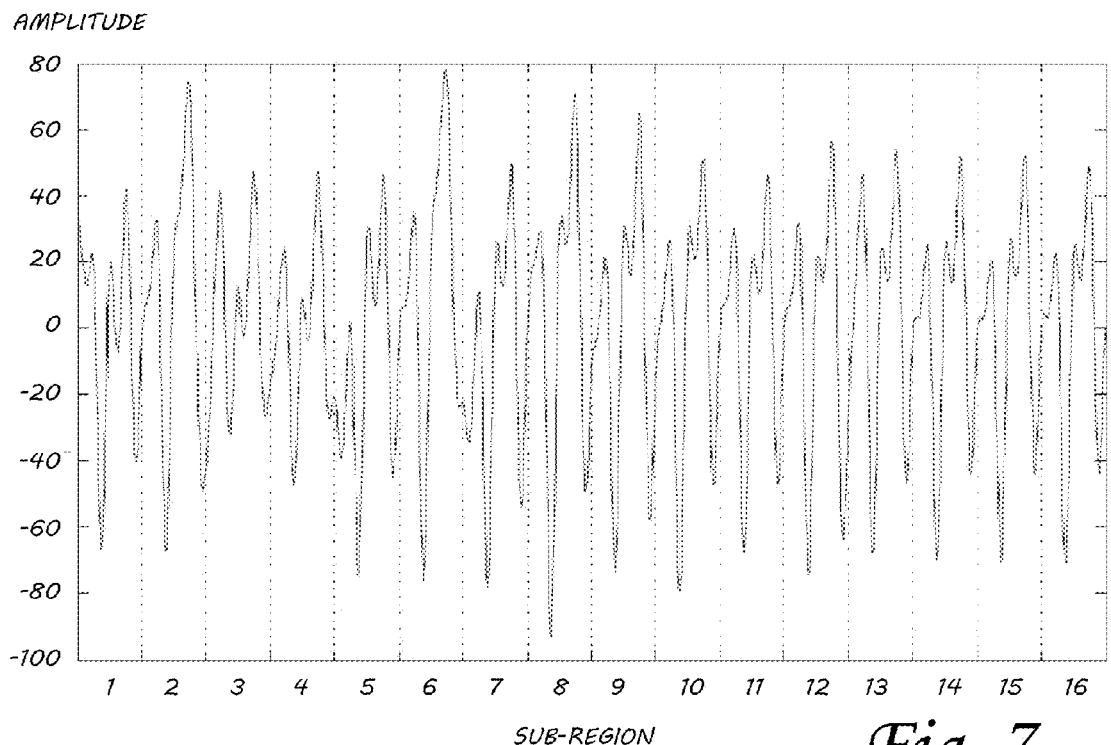
FIG. 7 is a graph illustrating an allocation of collected signal in subregions.

The results are obtained by partitioning the collected signals into $N_R=16$ sub-regions, selected from the first $N_{CL}$ clock cycles as illustrated in FIG. 7. The full $N_{CL}$ clock cycles are used as an additional region giving $N_{R+1}=17$ total regional contributions for each device. For each subregion, the four statistics are concatenated to form regional "distinct native attribute marker" vectors:

$$F_{R_i} = [\sigma_{R_i} \sigma_{R_i}^2 \gamma_{R_i} \kappa_{R_i}]_{1 \times 4}, \quad (8)$$

where i=1, 2, ..., $N_R$+1. The RF-DNA marker vectors from (8) are concatenated to form a "composite characteristic vector" for each selected characteristic (C) as:

$$F^C = \begin{bmatrix} F_{R_1} & \vdots & F_{R_2} & \vdots & F_{R_3} & \cdots & F_{R_{N_R+1}} \end{bmatrix}_{1 \times 4(N_R+1)}, \quad (9)$$

where the superscripted C denotes a specific characteristic response, i.e. a, φ, or f. Considering IA, IF, and IP, the final statistical fingerprint for each signal is a vector of $4 \times (N_R+1) \times 3 = 204$ total elements, formed as:

$$F = [F^a \vdots F^\phi \vdots F^f]_{1 \times 4(N_R+1) \times 3} \quad (10)$$

Figure 8:
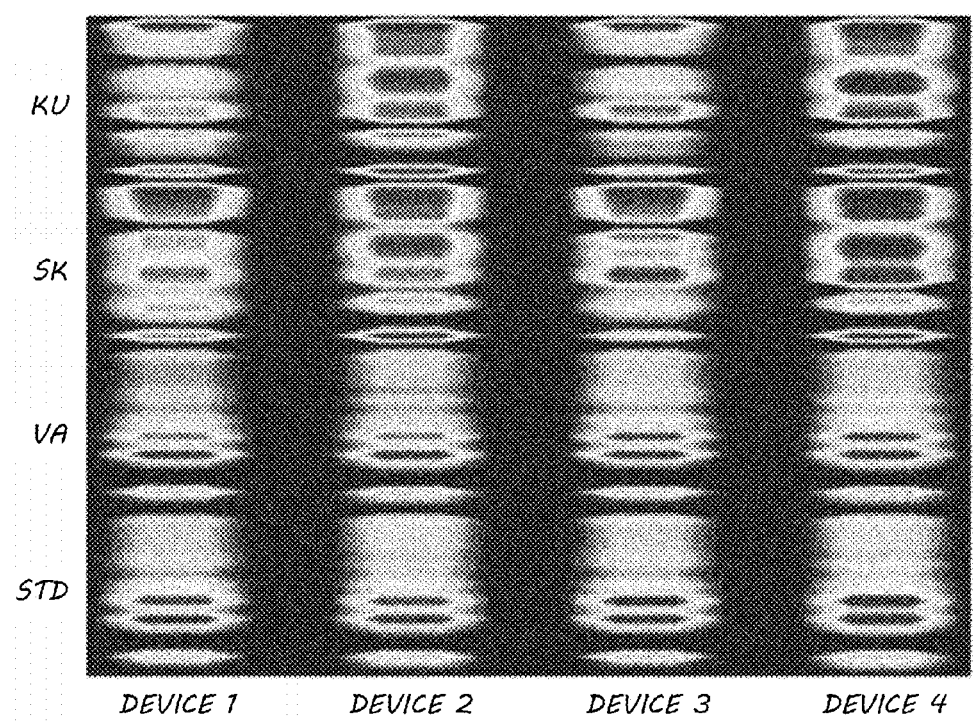
FIG. 8 is a graphical representation/visualization of average RF-DNA fingerprints over selected clock cycles.

An example of statistical RF-DNA fingerprint behavior across part numbers is presented in FIG. 8 for the four PIC microcontrollers 104 with identical part numbers (for scaled SNR=9 dB). The RF-DNA markers in F are scaled, compressed and/or expanded, and quantized to a desired number of discrete levels spanning the interval [0,1]. The quantized markers are stacked vertically to create an electrophoresis-like plot. These particular RF-DNA fingerprints highlight intra-part number variability, which is obvious from a visual inspection. At the depicted SNR, significant similarities are evident between device 1 and device 3 and between device 2 and device 4. Thus, intuitively, it is anticipated that the classifier will have greater difficulty distinguishing between the similar parts.

As with feature extraction, there are a large variety of techniques to choose from for signal classification. In general, most such techniques consist of a preparatory training phase followed by a decision or classification phase such as in block 118. Training, in some embodiments, may be accomplished using an extension of Fischer's linear discriminant analysis known as multiple discriminant analysis (MDA). Device classification decisions are made using a maximum likelihood (ML) classifier based on Bayesian decision theory as is known in the art.

To assess performance at scaled SNRs, MDA/ML classification may be implemented in some embodiments using Monte Carlo simulation with K-fold cross validation. Consistent with common practice, a value of K=5 is used such that the collection of $N_S$=500 statistical fingerprints (one for each sequence of operations) per device is divided into five blocks having $N_K$=100 fingerprints per block. Four blocks from each device are used for training and one block is "held out" for classification. The cross validation process is repeated five times until each of the five blocks has been "held out" and classified. Thus, each block of statistical fingerprints is used for training a total of four times. The results of all K=5 folds are averaged to produce a final average correct classification percentage.

Monte Carlo simulation is used to assess the effect of varying channel SNR conditions on classification performance. For each Monte Carlo iteration, a total of $N_S$ independent AWGN realizations are generated, filtered, scaled and added to the collected signals prior to fingerprint generation. Following a total of $N_Z$ Monte Carlo iterations at each desired SNR, K=5 fold MDA/ML classification results are averaged to obtain the overall average correct classification performance. The average percentage of correct classification presented in the figures is based on a total of $N_S \times N_Z$ independent classification decisions. All results for this illustrated embodiment are based on $N_S$=500 signals per device and $N_Z$=10 AWGN realizations.

CI=95% confidence intervals are calculated to determine statistical significance of the classification performance for each analysis SNR. The average values and corresponding CIs are based on a total of $N_S \times N_Z$=500×25=12,500 independent classification decisions for each device class. Note that these CIs only apply to the four particular devices studied in this embodiment, and are not intended to bound expected performance in general. The above procedure is repeated for each of four permutations, each of which trains (block 118 of FIG. 6) and classifies (block 120 of FIG. 6) using data collected from $N_D$=3 devices as shown in Table 1 below.

TABLE 1

Permutations of Individual PIC Microchips Used for MDA/ML Classification.

| | Device Designator | | | |
|---|---|---|---|---|
| Permutation | Device 1 | Device 2 | Device 3 | Device 4 |
| 1 | X | X | X | |
| 2 | X | X | | X |
| 3 | X | | X | X |
| 4 | | X | X | X |

The results for the specific embodiment were generated using IA, IP, and IF statistical fingerprint features, which achieved the best performance (at 95% significance) of all tested parameter combinations, for all permutations. Though, in applications, in some embodiments, where high SNR (≥20 dB) collections are obtainable, IP and IF may be unnecessary since IA alone provides >99.9% average classification performance.

The effect of the number of clock cycles and sub-regions on the MDA/ML classification performance was evaluated in a preliminary sensitivity analysis over $N_{CL}=\{8, 12, 16, 20\}$ and $N_R=\{N_{CL}, N_{CL}/2, N_{CL}/4\}$. At high SNRs (≥20 dB) performance exceeded 99.9% for $N_R=\{N_{CL}, N_{CL}/2\}$, and exceeded 90% with $N_R=N_{CL}/4$. Thus, at high SNR conditions $N_{CL}$=8 is sufficient, and no performance benefit is realized to compensate for increased computation time if more clock cycles are utilized. In general, for lower SNRs, performance shows a small statistical improvement in classification success as $N_{CL}$ increases at the expense of increased simulation and computation time. At the highest number of clock cycles studied ($N_{CL}$=20), performance is still gradually increasing. For subregion allocation, no statistical difference was observed in performance between the cases where NR corresponds to one or two clock cycles ($N_R=N_{CL}$ or $N_R=N_{CL}/2$), but allocating four clock cycles per sub-region ($N_R=N_{CL}/4$) resulted in decreased performance for most cases. The results for this illustrated embodiment are for the case where $N_{CL}=N_R=16$, which offers a reasonable trade-off between increased performance at lower SNRs and manageable execution time for the fingerprinting and classification process. In other embodiments it may be necessary to tune the number of operations and clock cycles used for classification to achieve adequate classification performance.

Figure 9:
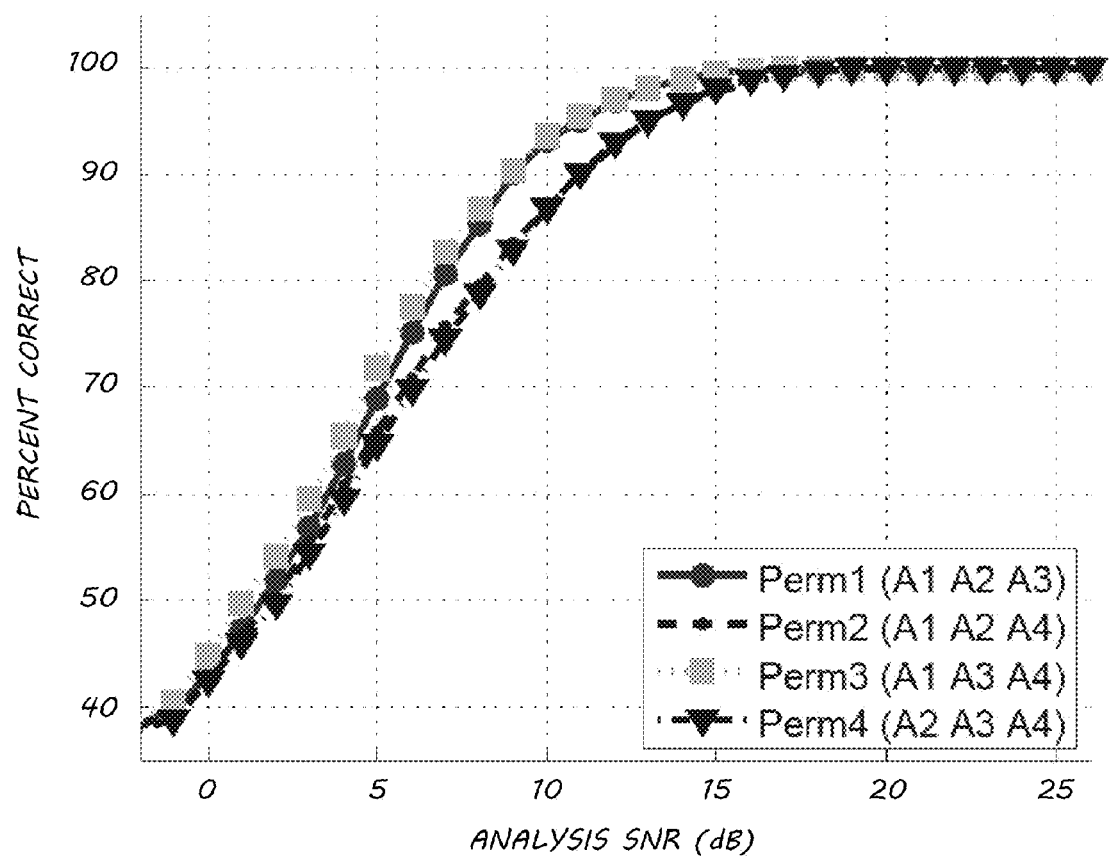
FIG. 9 is a graph illustrating classification results.

FIG. 9 shows overall average classification performance (across three devices at a time) for each of the four tested permutations. 95% CIs were calculated but are omitted from the plot for visual clarity since they are approximately the width of the data markers. The classifier achieves classification success of 99.9% at simulated SNRs≥20 dB, and performance gradually decreases until it becomes equivalent to "random guessing" at SNRs≤−5 dB. Table 2 below shows three selected confusion matrices for one of the experimental permutations. As expected based on the visual assessment of the RF-DNA plot in FIG. 8, more confusion occurs between devices 1 and 3 (their corresponding fingerprints are the most similar visually). The utility of FIG. 8 for cross-permutation assessment is also demonstrated by noting that the results from Perm 2 and Perm 4 in FIG. 9 are consistently the poorest. This is directly attributable to device 2 and device 4 fingerprints being the most similar of the four shown in FIG. 8.

TABLE 2

Confusion Matrices for Permutation #1 from Table 1
Classification Results at Selected SNRs (0, 9, and 21 dB)

| Actual Class | Class Estimate | | | Overall |
| --- | --- | --- | --- | --- |
| | Device 1 (%) | Device 2 (%) | Device 3 (%) | Average (%) |
| SNR = 0 dB | | | | |
| Device 1 | 39.9 | 26.2 | 33.9 | 42.9 |
| Device 2 | 25.9 | 47.7 | 26.5 | |
| Device 3 | 33.0 | 30.5 | 36.5 | |
| SNR = 9 dB | | | | |
| Device 1 | 85.9 | 1.6 | 12.5 | 90.1 |
| Device 2 | 1.5 | 97.6 | 0.9 | |
| Device 3 | 12.6 | 0.7 | 86.7 | |
| SNR = 21 dB | | | | |
| Device 1 | 100.0 | 0.0 | 0.0 | 100.0 |
| Device 2 | 0.0 | 100.0 | 0.0 | |
| Device 3 | 0.1 | 0.0 | 99.9 | |

Embodiments of the invention represent an improvement over contemporary techniques because the embodiments may be used to authenticate commodity commercial devices without requiring any modifications to the device being authenticated. All required modifications may be incorporated into the sensor module used to perform the authentication procedure (e.g., a smart-card reader, ATM machine, credit-card payment terminal, building access card readers, etc.). The approach implemented in the embodiments of the invention provides for more scalability and may be more viable for large-scale implementations because the number of readers is typically much smaller than the number of devices to be authenticated. In addition, space and power constraints are generally much less restrictive in the reader or interrogation device than in a secure token or other mobile IC-based device.

An alternate mode of operation is to transmit the raw measured data to a backend authentication server for fingerprint generation and authentication. This mode of operation has the advantage that the feature extraction and classifier training modules are less vulnerable to reverse engineering or other threats since they do not exist in the end-item. However, performing the authentication procedure in this manner would have substantially higher bandwidth requirements. Various hybrid approaches are also possible whereby some functions of the feature extraction and classifier training modules are performed at the end-terminal and other functions are performed on a backend authentication server. Finally, some functionality of the system database module and classification/feature matching module could also be relocated to the end-terminal to enable offline operation, at the expense of permitting physical access to those modules.

Although one envisioned application of the embodiments of this invention is to detect or prevent the use of copied or cloned devices in authentication schemes, the same technique may also be used for other purposes. Alternative employments of the embodiments of this invention may include identifying whether or not an IC is original or counterfeit, or detecting unauthorized modifications to IC designs (e.g., hardware Trojan detection).

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. For example, while the embodiments described herein utilize emissions in the radio frequency band, other embodiments of the invention may utilize electromagnetic emissions (both radiated and conducted) outside of the radio frequency band or variations in device power consumption. The invention in its broader aspects is therefore not limited to the specific details, representative apparatus and method, and illustrative examples shown and described. Accordingly, departures may be made from such details without departing from the scope of the general inventive concept.

What is claimed is:

1. A method of generating a fingerprint for an integrated circuit, the method comprising:
capturing, with a sensor module, electromagnetic emissions from the integrated circuit;
extracting, with a feature extraction module, discriminating features from the captured electromagnetic emissions;
generating, with a classifier training module, a plurality of authentication fingerprints of the integrated circuit from the extracted discriminating features;
creating a reference fingerprint template for the integrated circuit from the generated plurality of authentication fingerprints; and
storing the reference fingerprint template for the integrated circuit in a database.

2. The method of claim 1, further comprising:
instructing the integrated circuit to execute a known series of instructions,
wherein the sensor module captures the electromagnetic emissions during the execution of the know series of instructions.

3. The method of claim 1, wherein the feature extraction module is configured to:
extract features directly using an instantaneous amplitude response.

4. The method of claim 1, wherein the feature extraction module is configured to:
extract features using a signal-to-noise ratio scaled analysis signal.

5. The method of claim 4, wherein the classifier training module is configured to generate statistical fingerprints.

6. The method of claim 5, wherein the statistical fingerprints comprise statistical features of an instantaneous response.

7. The method of claim 6, wherein the statistical features are selected from a group consisting of standard deviation, variance, skewness, kurtosis, and combinations thereof.

8. The method of claim 1, wherein the database resides on a backend authentication server.

9. The method of claim 1, wherein the extracting, generating, and storing are performed on a backend authentication server.

10. A method of characterizing an integrated circuit, the method comprising:
capturing, with a sensor module, electromagnetic emissions from the integrated circuit;
extracting, with a feature extraction module, discriminating features from the captured electromagnetic emissions;
generating, with a classifier training module, an authentication fingerprint of the integrated circuit from the extracted discriminating features;
retrieving a reference fingerprint template for the integrated circuit from a database; and
comparing the reference fingerprint template from the database to the generated authentication fingerprint.

11. The method of claim 10, further comprising:
instructing the integrated circuit to execute a known series of instructions,
wherein the sensor module captures the electromagnetic emissions during the execution of the know series of instructions, and
wherein the retrieved reference fingerprint template was generated using the same known series of instructions.

12. The method of claim 10, wherein the feature extraction module is configured to:
extract features directly using an instantaneous amplitude response.

13. The method of claim 10, wherein the feature extraction module is configured to:
extract features using a signal-to-noise ratio scaled analysis signal.

14. The method of claim 13, wherein the classifier training module is configured to generate statistical fingerprints.

15. The method of claim 14, wherein the statistical fingerprints comprise statistical features of an instantaneous response.

16. The method of claim 15, wherein the statistical features are selected from a group consisting of standard deviation, variance, skewness, kurtosis, and combinations thereof.

17. The method of claim 10, wherein the database resides on a backend authentication server.

18. The method of claim 10, wherein the extracting, generating, and storing are performed on a backend authentication server.

19. A system for characterizing an integrated circuit, the system comprising:
a sensor module configured to capture electromagnetic emissions from the integrated circuit;
a feature extraction module configured to extract discriminating features from the captured electromagnetic emissions;
a classifier training module configured to generate an authentication fingerprint of the integrated circuit from the extracted discriminating features; and
a backend authentication server configured to compare a reference fingerprint from a database to the generated authentication fingerprint.

* * * * *